US006552658B1

(12) United States Patent
Roller et al.

(10) Patent No.: US 6,552,658 B1
(45) Date of Patent: Apr. 22, 2003

(54) LIGHT EMITTING DIODE FLASHING DIRECTIONAL WARNING LAMP

(76) Inventors: Philip C. Roller, 1425 Blockville, Watts Flats Rd., Ashville, NY (US) 14710; Gregory Pond, 2168 Willard St. Ext., Jamestown, NY (US) 14701-9614; Chris A. Suckow, 4235 Butman Rd., Kennedy, NY (US) 14747-9758

( * ) Notice: Subject to any disclaimer, the term of this patent is extended or adjusted under 35 U.S.C. 154(b) by 742 days.

(21) Appl. No.: 08/951,957

(22) Filed: Oct. 17, 1997

(51) Int. Cl.⁷ .................................................. B60Q 1/34
(52) U.S. Cl. .......................... 340/475; 340/468; 345/82
(58) Field of Search ................................ 340/468, 471, 340/475, 815.45, 815.53; 345/82; 362/498

(56) References Cited

U.S. PATENT DOCUMENTS

| | | | | |
|---|---|---|---|---|
| 4,290,048 A | * | 9/1981 | Cutlip et al. ................ | 340/475 |
| 4,893,111 A | * | 1/1990 | Roller ......................... | 340/471 |
| 4,914,731 A | * | 4/1990 | Chen ....................... | 340/815.45 |
| 5,175,528 A | * | 12/1992 | Choi et al. .................. | 340/471 |
| 5,313,188 A | * | 5/1994 | Choi et al. .................. | 340/471 |
| 5,325,271 A | * | 6/1994 | Hutchisson .................. | 362/61 |
| 5,504,660 A | * | 4/1996 | Heidorn ................. | 340/815.45 |

* cited by examiner

*Primary Examiner*—Brent A. Swarthout
(74) *Attorney, Agent, or Firm*—The Bilicki Law Firm, P.C.

(57) ABSTRACT

A light emitting diode directional flashing warning lamp, having a housing, a printed circuit board secured within the housing, a plurality of light emitting diodes mounted to the printed circuit board and operatively arranged to produce light which is directed away from the housing and directionally aimed to project a beam over a minimum area from approximately 20° right to 20° left on a horizontal plane and from 10° up to 10° down on a vertical plane, and a driving circuit operatively arranged to flash the plurality of light emitting diodes.

18 Claims, 5 Drawing Sheets

LIGHT EMITTING DIODE FLASHING DIRECTIONAL WARNING LAMP

FIELD OF THE INVENTION

The present invention relates generally to directional flashing warning lamps, more particularly to a light emitting diode (LED) directional lamp, and, even more particularly, to an LED directional lamp which meets Society of Automotive Engineers (SAE) standards.

BACKGROUND OF THE INVENTION

The Society of Automotive Engineers (SAE) publishes many new, revised, and reaffirmed standards each year in three categories, including Ground Vehicle Standards (J-Reports). Information on these standards is available on the World Wide Web at http://www.sae.org.

Two of these SAE standards are pertinent to this invention. SAE standard J595 provides design guidelines, test procedure references, and performance requirements for flashing incandescent warning lamps. It is intended to apply to, but is not limited to, surface land vehicles. The purpose of the standard is to establish general requirements for flashing warning lamps for use on authorized emergency, maintenance, and service vehicles. This standard applies only to incandescent warning lamps, presumably because heretofore only incandescent lamps could meet this standard.

A flashing warning lamp is defined by the standard as a lamp in which the light source is turned on and off by circuit interruption producing a repetitive flash of light which is directionally aimed and will project a flashing beam signal over a minimum area from 20° right to 20° left on a horizontal plane and from 10° up to 10° down on a vertical plane.

Reprinted herebelow are the photometric requirements of a warning lamp as stated in Tables 1 and 2, respectively of J595:

SAE Standard J595

TABLE 1

PHOTOMETRIC DESIGN GUDELINES

| Test Points | Luminous Intensity, Candela | | |
| --- | --- | --- | --- |
| deg | White | Yellow | Red |
| 5L | 80 | 40 | 20 |
| 10U-V | 200 | 100 | 50 |
| 5R | 80 | 40 | 20 |
| 20L | 80 | 40 | 20 |
| 10L | 200 | 100 | 50 |
| 5L | 400 | 200 | 100 |
| 5U-V | 600 | 300 | 150 |
| 5R | 400 | 200 | 100 |
| 10R | 200 | 100 | 50 |
| 20R | 80 | 40 | 20 |
| 20L | 120 | 60 | 30 |
| 10L | 300 | 150 | 75 |
| 5L | 800 | 400 | 200 |
| H-V | 1200 | 600 | 300 |
| 5R | 800 | 400 | 200 |
| 10R | 300 | 150 | 75 |
| 20R | 120 | 60 | 30 |
| 20L | 80 | 40 | 20 |
| 10L | 200 | 100 | 50 |
| 5L | 400 | 200 | 100 |
| 5D-V | 600 | 300 | 150 |
| 5R | 400 | 200 | 100 |
| 10R | 200 | 100 | 50 |
| 20R | 80 | 40 | 20 |
| 20L | 80 | 40 | 20 |
| 10L | 200 | 100 | 50 |
| 5L | 400 | 200 | 100 |
| 5D-V | 600 | 300 | 150 |
| 5R | 400 | 200 | 100 |
| 10R | 200 | 100 | 50 |
| 20R | 80 | 40 | 20 |
| 5L | 80 | 40 | 20 |
| 10D-V | 200 | 100 | 50 |
| 5R | 80 | 40 | 20 |

TABLE 2

PHOTOMETRIC REQUIREMENTS

| Zones | Test Points deg | White Zone Total | Yellow Zone Total | Red Zone Total |
| --- | --- | --- | --- | --- |
| 1 | 5U-10L<br>5U-20L<br>H-20L<br>5D-20L<br>5D-10L | 600 | 300 | 150 |
| 2 | 10U-5L<br>10U-V<br>10U-5R | 320 | 160 | 80 |
| 3 | 5U-5L<br>H-10L<br>5D-5L | 1000 | 500 | 250 |
| 4 | 5U-V<br>H-5L<br>H-V<br>H-5R<br>5D-V | 3600 | 1800 | 900 |
| 5 | 5U-R<br>H-10R<br>5D-SR | 1000 | 500 | 250 |
| 6 | 10D-5L<br>10D-V<br>10D-5R | 320 | 160 | 80 |
| 7 | 5U-10R<br>5U-20R<br>H-20R<br>5D-20R<br>5D-10R | 600 | 300 | 150 |

SAE standard J1318 also applies to directional warning lamps. The standard defines a directional warning lamp as a lamp that produces a repetitive flash of light which is directionally aimed and will project a flashing beam signal over a minimum area from 20° right to 20° left on a horizontal plane and from 10° up to 10° down on a vertical plane. Reprinted herebelow are the photometric requirements of a directional warning lamp as stated in Tables 4 and 8, respectively, of J1318:

SAE Standard J1318

TABLE 4

PHOTOMETRIC REQUIREMENTS CLASS 1
DIRECTIONAL GASEOUS DISCHARGE WARNING LAMPS
Minimum Flash Energy Requirements Zone Totals (Candela-Seconds)

Flash Energy-Candela Seconds

| Zone | Test Point Degree | White | Yellow | Red | Signal Blue |
|---|---|---|---|---|---|
| #1 | 5U-10L<br>5U-20L<br>H-20L<br>5D-20L<br>5D-10L | 108 | 54 | 27 | * |
| #2 | 10U-5L<br>10U-V<br>10U-5R | 56 | 28 | 14 | * |
| #3 | 5U-5L<br>H-10L<br>5D-5L | 184 | 92 | 46 | * |
| #4 | 5U-V<br>H-5L<br>H-V<br>H-5R<br>5D-V | 664 | 332 | 116 | * |
| #5 | 5U-R<br>H-10R<br>5D-5R | 184 | 92 | 46 | * |
| #6 | 10D-51<br>10D-V<br>10D-5R | 56 | 28 | 14 | * |
| #7 | 5U-10R<br>5U-20R<br>H-20R<br>5D-20R<br>5D-10R | 108 | 54 | 27 | * |

TABLE 8

PHOTOMETRIC DESIGN GUIDELINES
DIRECTIONAL, GASEOUS DISCHARGE WARNING LAMPS
Minimum Flash Energy Guidelines
Warning Lamps Flash Energy-Candela-Seconds

| Test Point Degree | White | Yellow | Red | Signal Blue |
|---|---|---|---|---|
| 10U-5L | 12 | 6 | 3 | * |
| 10U-V | 32 | 16 | 8 | * |
| 10U-5R | 12 | 6 | 3 | * |
| 5U-20L | 12 | 6 | 3 | * |
| 5U-10L | 32 | 16 | 8 | * |
| 5U-5L | 68 | 34 | 17 | * |
| 5U-V | 100 | 50 | 25 | * |
| 5U-5R | 68 | 34 | 17 | * |
| 5U-10R | 32 | 16 | 8 | * |
| 5U-20R | 12 | 6 | 3 | * |
| H-20L | 20 | 10 | 5 | * |
| H-10L | 48 | 24 | 12 | * |
| H-5L | 132 | 66 | 33 | * |
| H-V | 200 | 100 | 50 | * |
| H-5R | 132 | 66 | 33 | * |
| H-10R | 48 | 24 | 12 | * |
| H-20R | 20 | 10 | 5 | * |
| 5D-20L | 12 | 6 | 3 | * |
| 53-10L | 32 | 16 | 8 | * |
| 5D-5L | 68 | 34 | 17 | * |
| 5D-V | 100 | 50 | 25 | * |
| 5D-5R | 68 | 34 | 17 | * |
| 5D-10R | 32 | 16 | 8 | * |
| 5D-20R | 12 | 6 | 3 | * |
| 10D-5L | 12 | 6 | 3 | * |
| 10D-V | 32 | 16 | 8 | * |
| 10D-5R | 12 | 6 | 3 | * |

TABLE 8-continued

PHOTOMETRIC DESIGN GUIDELINES
DIRECTIONAL, GASEOUS DISCHARGE WARNING LAMPS
Minimum Flash Energy Guidelines
Warning Lamps Both standards J595 and J1318 are incorporated herein by reference. Heretofore, only incandescent lamps have been manufactured to meet J595, and only incandescent and gas discharge lamps have been manufactured to meet standard J1318. What is needed, then, is a light assembly comprising LEDs which meets the requirements of SAE J595 and J1318.

SUMMARY OF THE INVENTION

The invention broadly comprises a light emitting diode flashing directional warning lamp, having a housing, a printed circuit board secured within the housing, a plurality of light emitting diodes mounted to the printed circuit board and operatively arranged to produce light which is directed away from the housing and directionally aimed to project a beam over a minimum area from approximately 20° right to 20° left on a horizontal plane and from 10° up to 10° down on a vertical plane, and a driving circuit operatively arranged to flash the plurality of light emitting diodes.

The principal object of this invention is to provide a light emitting diode flashing directional warning lamp which meets Society of Automotive Engineers Standards J595 and J1318.

Another object of the invention is to provide a directional warning lamp that is more efficient to operate, and less susceptible to vibration, than conventional incandescent and gas discharge lamps.

These and other objects, features and advantages of the invention will become readily apparent from the following detailed description, the drawings and claims.

DETAILED DESCRIPTION OF THE PREFERRED EMBODIMENT

At the outset, it should be understood that this invention comprises a light emitting diode flashing directional warning lamp which meets selected SAE standards. Although a particular preferred embodiment of the invention is described herein, it should be readily apparent that various other alternative embodiments may be accomplished without departing from the scope or spirit of the invention. Like reference numerals refer to identical structural elements in the various drawings.

Figure 1:
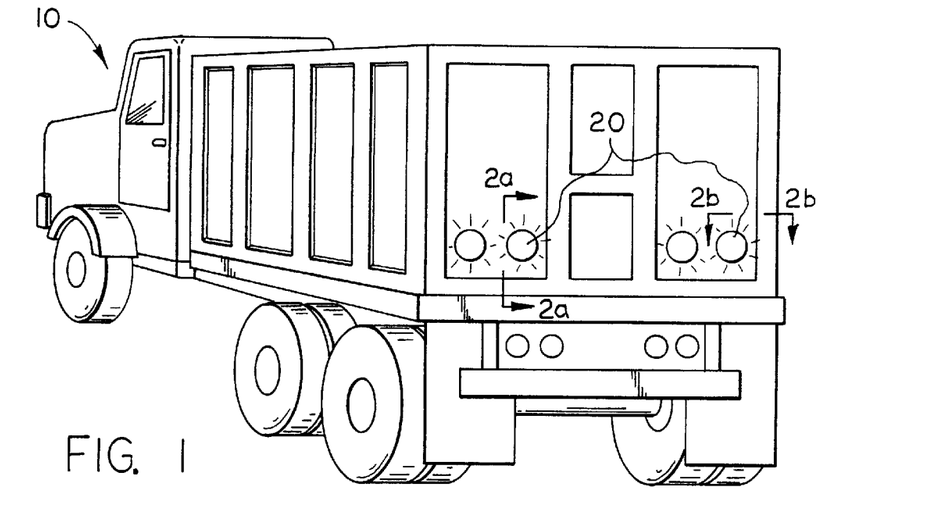
FIG. 1 is a perspective view of a utility truck having flashing directional warning lamps of the invention affixed to the rear thereof.

FIG. 1 is a perspective view of a utility truck 10 having four flashing light emitting diode directional warning lamps 20 affixed to the rear thereof. The lamps may be mounted to any vehicle and are not necessarily limited to trucks.

Figure 2A:
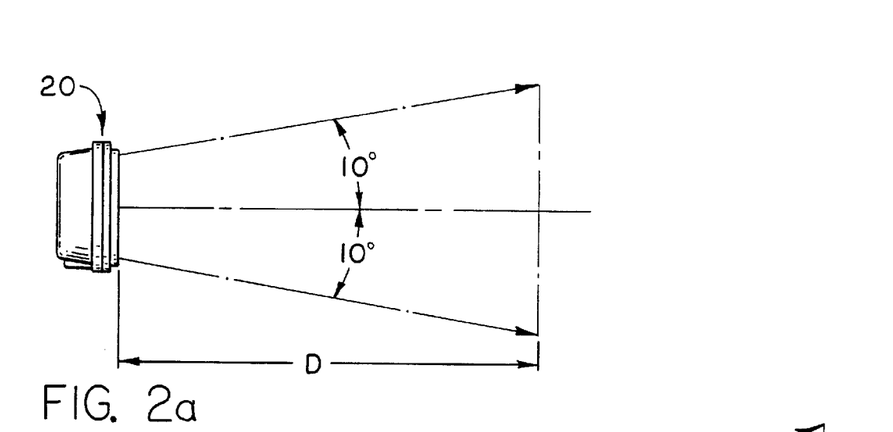
FIG. 2a is a side view of one of the lamps shown in FIG. 1, in a view intended to illustrate one of the photometric requirements of the lamp.
Figure 2B:
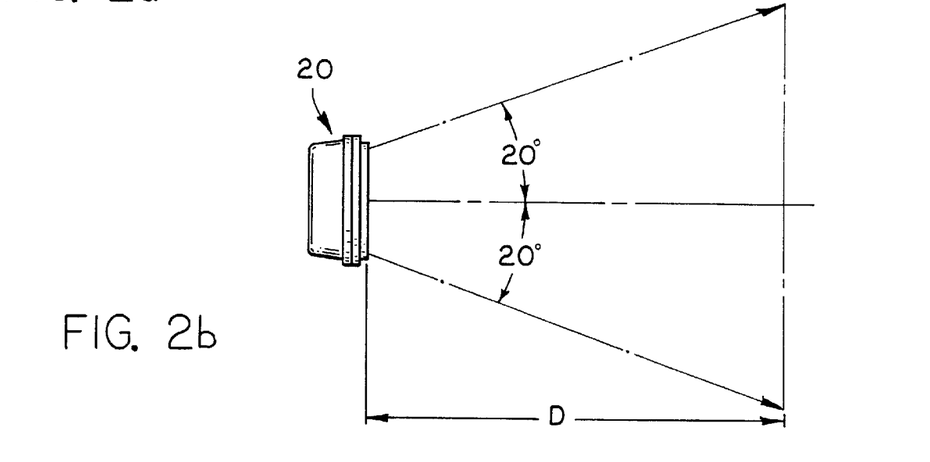
FIG. 2b is a top view of one of the lamps shown in FIG. 1, in a view intended to illustrate another of the photometric requirements of the lamp.

To meet SAE standards, lamp 20 must project a flashing beam of light over a minimum area from 20° right to 20° left on a horizontal plane, and from 10° up to 10° down on a vertical plane. FIG. 2a is a side view of one of the lamps 20 shown in FIG. 1, illustrating the 10° up/10° down beam requirement. FIG. 2b is a top view of one of the lamps 20 shown in FIG. 1, illustrating the 20° left/20° right beam requirement. The SAE minimum flash energy requirements of J1318 are measured at a distance "D" equal to at least 18 meters away from the lamp, and the luminous intensity requirements of J595 are measured at a distance "D" equal to at least 3 meters away.

Figure 3:
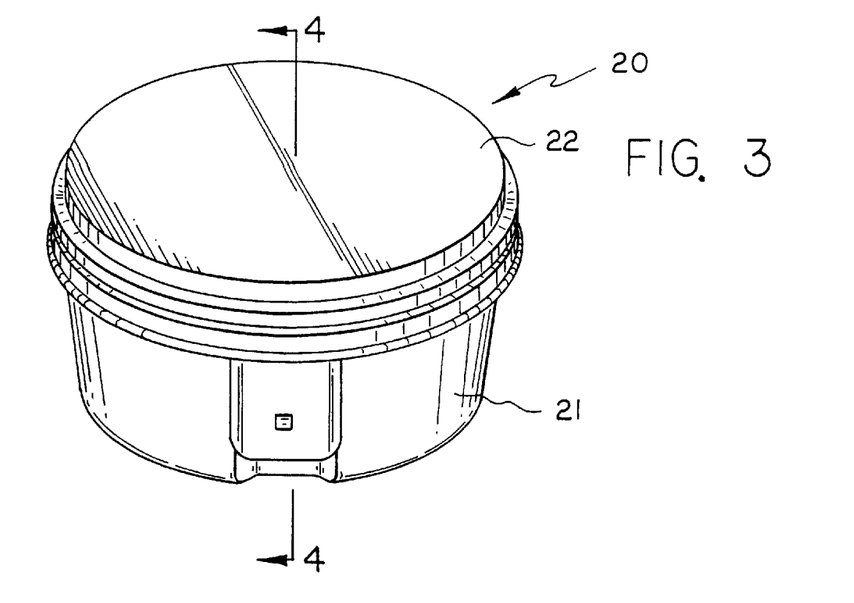
FIG. 3 is a perspective view of the directional warning lamp of the invention.

Lamp 20 is illustrated in perspective view in FIG. 3. The lamp broadly comprises a housing 21 and lens 22 affixed thereto.

Figure 4:
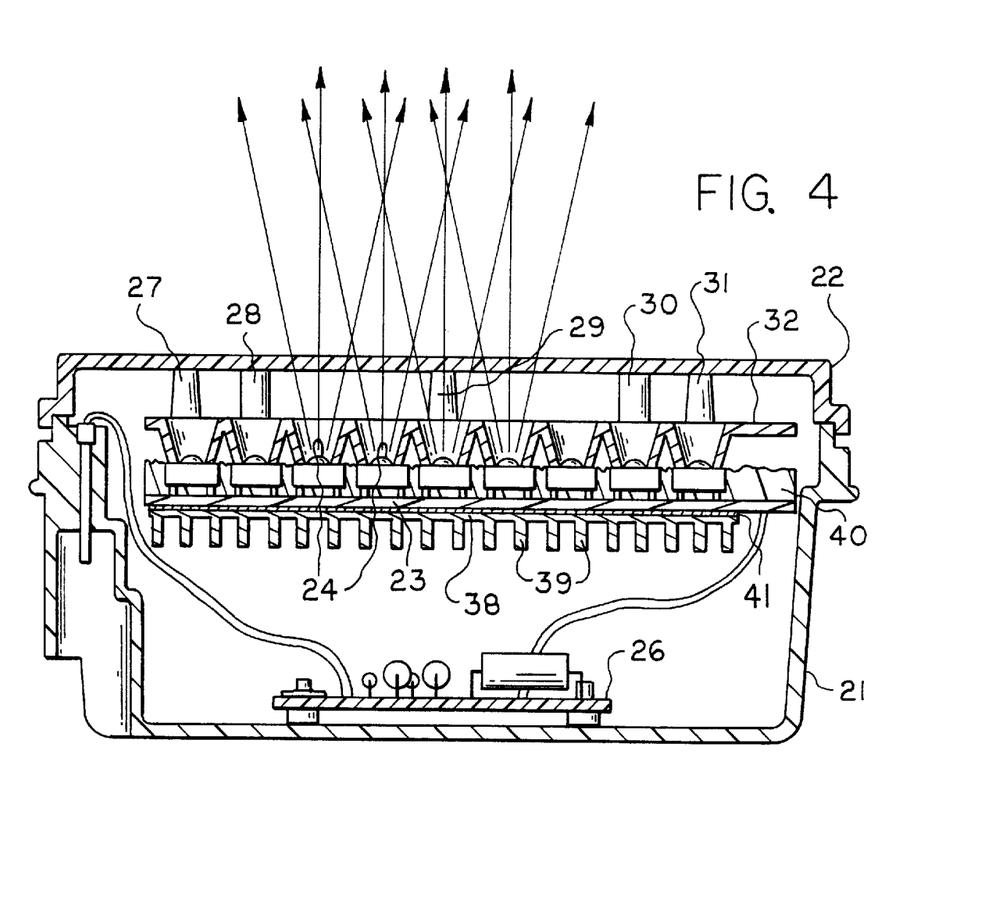
FIG. 4 is a cross-sectional view of the lamp shown in FIG. 3, taken generally along line 4—4 in FIG. 3.

The components of the lamp are shown in cross-sectional view in FIG. 4, which is a view taken generally along line 4—4 in FIG. 3. The components are also shown in exploded view in FIG. 5. Adverting now to FIGS. 3, 4 and 5, housing 21 is preferably round and made of plastic, although other shapes and compositions are certainly possible. Circuit board 26 is mounted to the floor of the housing and contains several circuit components of the drive circuit shown in FIG. 7 (although many of the drive circuit components are preferably located on a circuit board which is remote from the housing).

Figure 5:
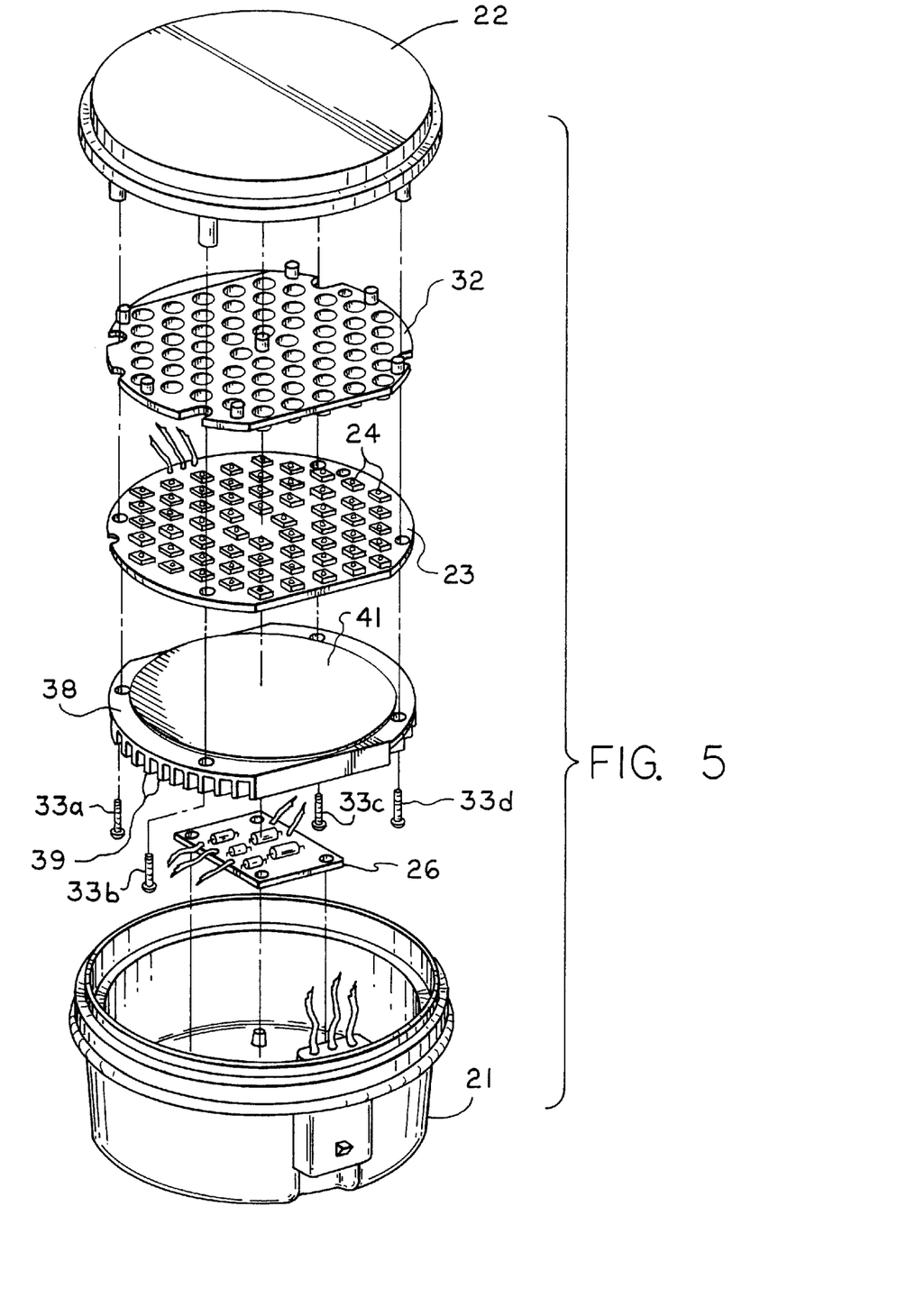
FIG. 5 is an exploded view of the warning lamp shown in FIG. 3.

Plurality of light emitting diodes (LEDs) 24 are mounted to circuit board 23. High light output LEDs should be used for the warning lamp. In a preferred embodiment, LEDs part no. HPWT-DH00 (red), manufactured by Hewlett Packard were used. Other suitable Hewlett Packard LEDs are model nos. HPWT-DL00 (amber), HLMP-DL08 (amber), HLMP-DH08 (red), HLMT-DH08 (red) and HLMT-DL08 (amber); although LEDs from other manufacturers may also be suitable. To meet SAE standards, a minimum number of LEDs must be operational on each board. Although the exact number may vary, dependent upon the model LED used, the light output of each LED, the color LED and lens used, and other factors, it has been found that a quantity of sixty (60) HPWT-DH00 LEDs meet SAE photometric requirements.

Since the LEDs generate a certain amount of heat, it is preferable that a heat sink be used to dissipate this heat. Heat sink 38, preferably made of aluminum, is thermally connected to the printed circuit board, but electrically insulated therefrom by heat conductive electrical insulator 41. Heat is conveyed away from the sink by fins 39.

Figure 6:
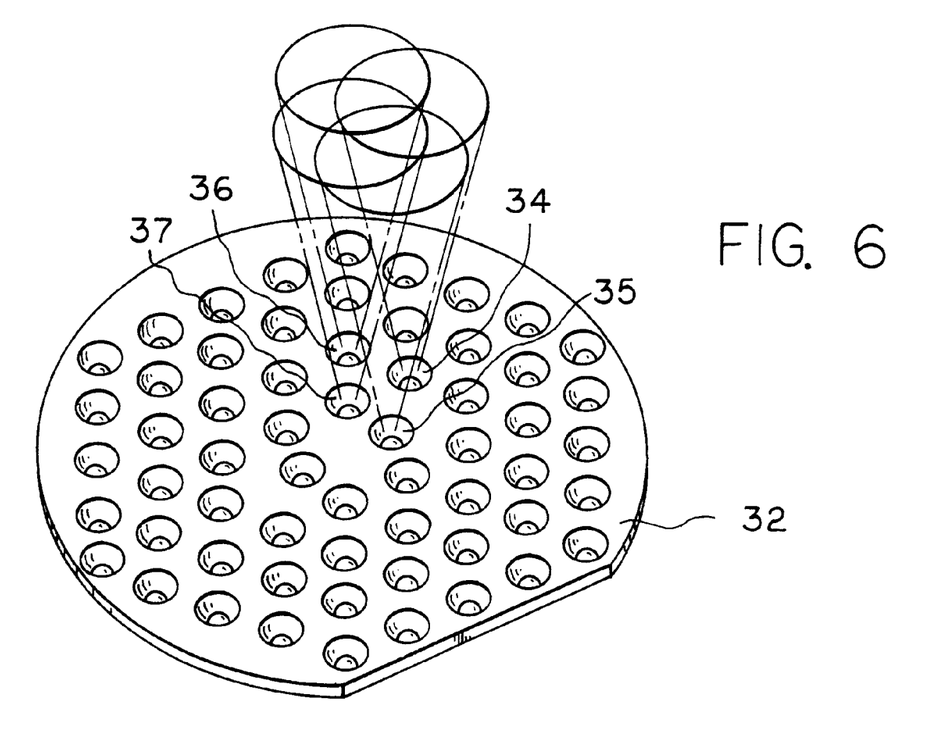
FIG. 6 is a perspective view of the light directing element of the invention.

Light directing element 32 contains a plurality of light directing/reflecting compartments, with each compartment arranged to direct the light emitted from a particular LED. Element 32 may be constructed of a reflective material, such as aluminum, or may be made of a non-reflective substrate such as plastic, and then coated with a reflective material. Element 32 is shown in an enlarged perspective view in FIG. 6. Compartments 34–37 are seen to be frustoconical in shape, with a smaller opening at one end of each compartment intended to fit snugly over each LED. Each compartment widens in diameter away from the LED, so as to reflect and direct light from each LED into a substantially conically shaped beam. Four such beams formed by compartments 34–37 are shown in FIG. 6.

Lens 22 is positioned atop light reflecting/directing element 32. The lens may be transparent or translucent. It may be clear in color, red, amber or of another color. It may be made of plastic, glass or any other suitable material which passes light. In a preferred embodiment, the lens is made of plastic.

Heat sink 38, circuit board 23, light reflecting/directing element 32, and lens 22 are held together by mounting screws 33a–33d which pass through bores in elements 38, 23 and 32 and are received in threaded receivers in lens 22.

It is preferable that the lamp assembly be resistant to vibration and moisture. To this end, and adverting to FIG. 4, an epoxy 40 is poured atop circuit board 23 and allowed to flow about the LED housings (at a height lower than the LEDs themselves). When the epoxy sets, the LEDs become locked firmly in place upon the circuit board, and are extremely resistant to vibration and moisture.

Figure 7:
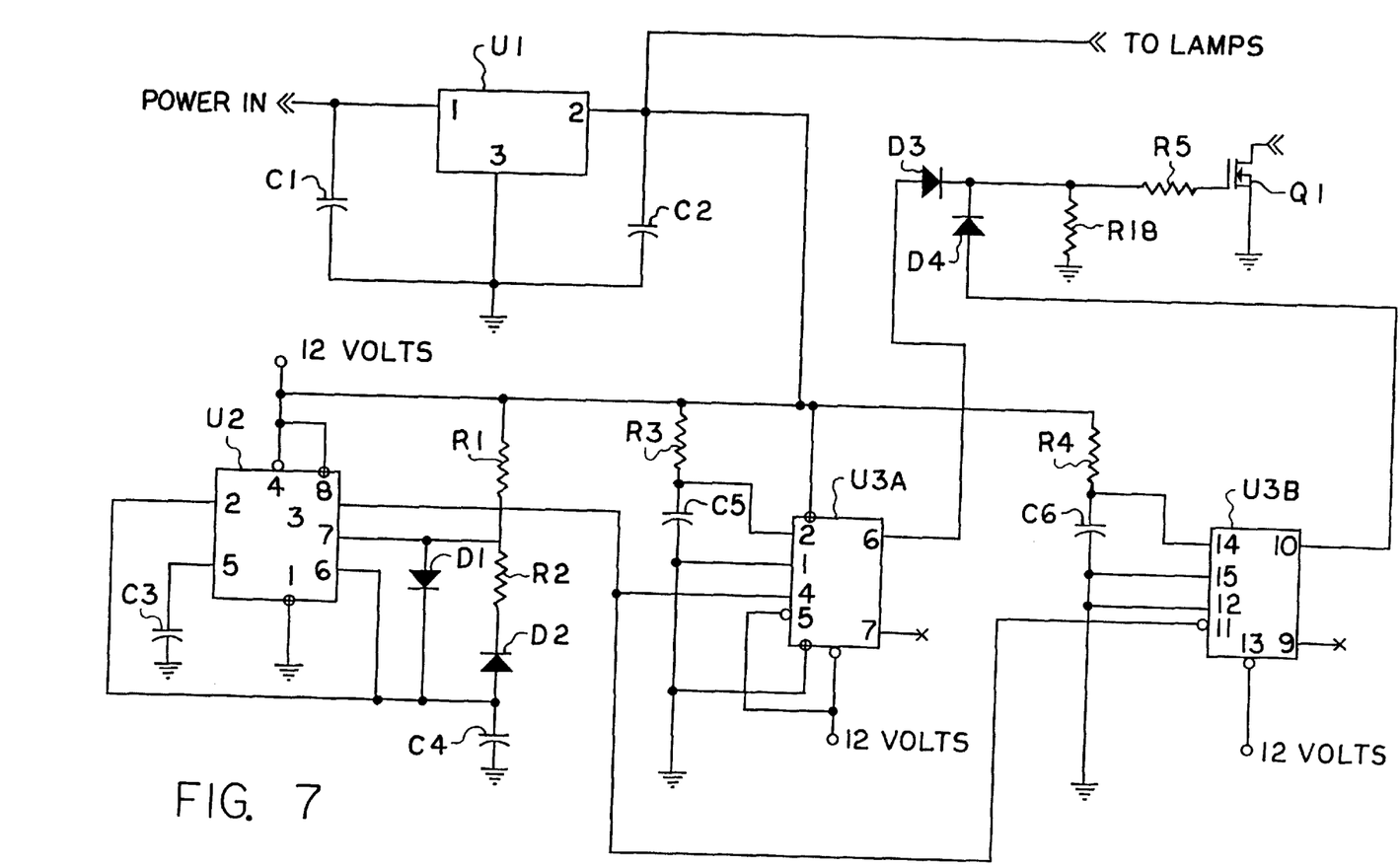
FIG. 7 is an electrical schematic diagram of the driver circuit of the invention.

The plurality of LEDs are caused to flash by the drive circuit illustrated in FIG. 7.

The circuit comprises a regulator circuit which supplies power to an oscillator circuit and a pair of monostable (oneshot) oscillators which drive the LED array. The output of each oneshot is connected to an OR gate, the output of which is connected to a transistor switch which controls the illumination of the LED lamps. In operation the oscillator produces an "on" pulse of relatively short duration followed by a relatively long "off" duration. This signal is applied simultaneously to each oneshot. However, the first oneshot is configured to trigger on the positive going edge of the pulse and the second is configured to trigger on the negative going edge of the pulse. The timing of each oneshot is set at some duration less than that of the oscillator's on-time; thus the two oneshots produce short duration pulses in sequence followed by a relatively long rest period. The output is combined in the OR gate and applied to the transistor switch thus producing flashes of light from the LED lamp that correspond to the output of the OR gate. The result is two short duration flashes of light followed by a relatively long rest period followed by the two short duration flashes and so on. The circuitry may be enclosed within one lamp unit and fed to other lamps in a "Master, Slave" configuration or may be located outside of the lamp unit in a separate encapsulated module.

The circuit consists of integrated circuits U1 (an LM7812 three terminal fixed positive 12 volt voltage regulator), U2 (an NE555 timer), U3 (a 4098 CMOS dual oneshot multivibrator); diodes D3 and D4 (which form a diode or gate); and transistor Q1 (an N channel power MOSFET).

The voltage regulator circuit, consisting of capacitors C, C2, and the LM7812, holds the voltage at a constant 12 volts for operation of the circuit. The NE555 timer is configured in a typical form as a pulse generator with diodes D1 and D2, capacitor C4, and resistors R1 and R2 chosen to produce a pulse width of about 140 milliseconds, and a pulse recurrent time of about 1.3 seconds. The timing components of both halves of the 4098 oneshot (C5 and R3, and C6 and R4) are chosen to produce a pulse width of about 80 milliseconds. The output from pin 3 of the NE555 (U2) is applied to both halves of the 4098 simultaneously, however, the signal is applied to the positive trigger input (pin 4 of U3A) of one and the negative trigger input of the other (pin 11 of U3B). The result is that there is an 80 msec pulse produced at pin 6 of U3A upon the positive going transition of the output pulse from U2 and another produced at pin 10 of U3B upon the negative going transition of the output from U2. The outputs from pins 6 and 10 are combined in a diode "or" gate formed by diodes D3 and D4. The result is a pair of pulses of 80 msec duration separated by approximately 60 msec of off time recurring every 1.3 seconds. The output of the "or" gate is applied to the transistor which is used to switch the ground to an LED lamp or plurality of LED lamps 15 to produce an "attention getting," strobe-like, double flash separated by about 1.2 seconds of off time and then repeating as long as the power is applied.

It should be appreciated that the driving circuit shown in FIG. 7 is but one example of a suitable LED driver circuit. Programmable circuits, as well as other driving circuits, are readily known in the art. Although our invention is described by reference to specific preferred embodiments, it is clear that variations can be made without departing from the spirit of the invention as claimed.

What we claim is:

1. A light emitting diode flashing directional warning lamp, comprising:

a housing;

a lens secured to said housing;

a printed circuit board secured within said housing;

a plurality of light emitting diodes mounted to said printed circuit board and operatively arranged to produce light which is directed away from said housing and directionally aimed to project a beam through said lens over a minimum area from approximately 20° right to 20° left on a horizontal plane and from 10° up to 10° down on a vertical plane; and a driving circuit operatively arranged to flash said plurality of light emitting diodes;

wherein said warning lamp satisfies the minimum photometric requirements of Society of Automotive Engineers Standards J595 and J1318.

2. A warning lamp as recited in claim 1 wherein said lens is transparent.

3. A warning lamp as recited in claim 1 wherein said lens is translucent.

4. A warning lamp as recited in claim 1 wherein said lens is clear in color.

5. A warning lamp as recited in claim 1 wherein said lens is red in color.

6. A warning lamp as recited in claim 1 wherein said lens is amber in color.

7. A warning lamp as recited in claim 1 wherein said lens is signal blue in color.

8. A light emitting diode flashing directional warning lamp as recited in claim 1 wherein said lamp produces white light having a minimum luminous intensity of 80 candela measured at a distance of at least 3 meters away from said lamp.

9. A light emitting diode flashing directional warning lamp as recited in claim 1 wherein said lamp produces yellow light having a minimum luminous intensity of 40 candela measured at a distance of at least 3 meters away from said lamp.

10. A light emitting diode flashing directional warning lamp as recited in claim 1 wherein said lamp produces red light having a minimum luminous intensity of 20 candela measured at a distance of at least 3 meters away from said lamp.

11. A light emitting diode flashing directional warning lamp as recited in claim 1 wherein said lamp produces signal blue light.

12. A light emitting diode flashing directional warning lamp as recited in claim 1 having a minimum flash energy in the range of 2 to 48 candela-seconds measured at a distance of at least 18 meters away from said lamp.

13. A light emitting diode flashing directional warning lamp as recited in claim 1 wherein said lamp produces yellow light having a minimum flash energy in the range of 1 to 22.5 candela-seconds measured at a distance of at least 18 meters away from said lamp.

14. A light emitting diode flashing directional warning lamp as recited in claim 1 wherein said lamp produces red light having a minimum flash energy of 0.5 to 11 candela-seconds measured at a distance of at least 18 meters away from said lamp.

15. A light emitting diode flashing directional warning as recited in claim 1 wherein said lamp produces signal blue light having a minimum flash energy of 0.25 to 11 candela-seconds measured at a distance of at least 18 meters away from said lamp.

16. A light emitting diode flashing directional warning lamp as recited in claim 1 further comprising a light reflecting/directing element secured to said printed circuit board and operatively arranged to project a beam of light through said lens for each light emitting diode.

17. A light emitting diode flashing directional warning lamp as recited in claim 1 wherein said light emitting diodes are secured to said printed circuit board both by soldered leads and by epoxy.

18. A light emitting diode flashing directional warning lamp as recited in claim 1 wherein said driving circuit causes said plurality of light emitting diodes to flash at a rate of 0.8 to 2.2 Hz.

* * * * *

UNITED STATES PATENT AND TRADEMARK OFFICE
CERTIFICATE OF CORRECTION

PATENT NO. : 6,552,658 B1 Page 1 of 1
APPLICATION NO. : 08/951957
DATED : April 22, 2003
INVENTOR(S) : Roller et al.

It is certified that error appears in the above-identified patent and that said Letters Patent is hereby corrected as shown below:

Item [73], Assignee, should read -- Truck-Lite Co., Inc. --

Signed and Sealed this

Twenty-seventh Day of November, 2007

JON W. DUDAS
*Director of the United States Patent and Trademark Office*